J. G. MAYER.
HAY CARRIER.
APPLICATION FILED FEB. 21, 1921.
1,435,123.
Patented Nov. 7, 1922.
2 SHEETS—SHEET 2.
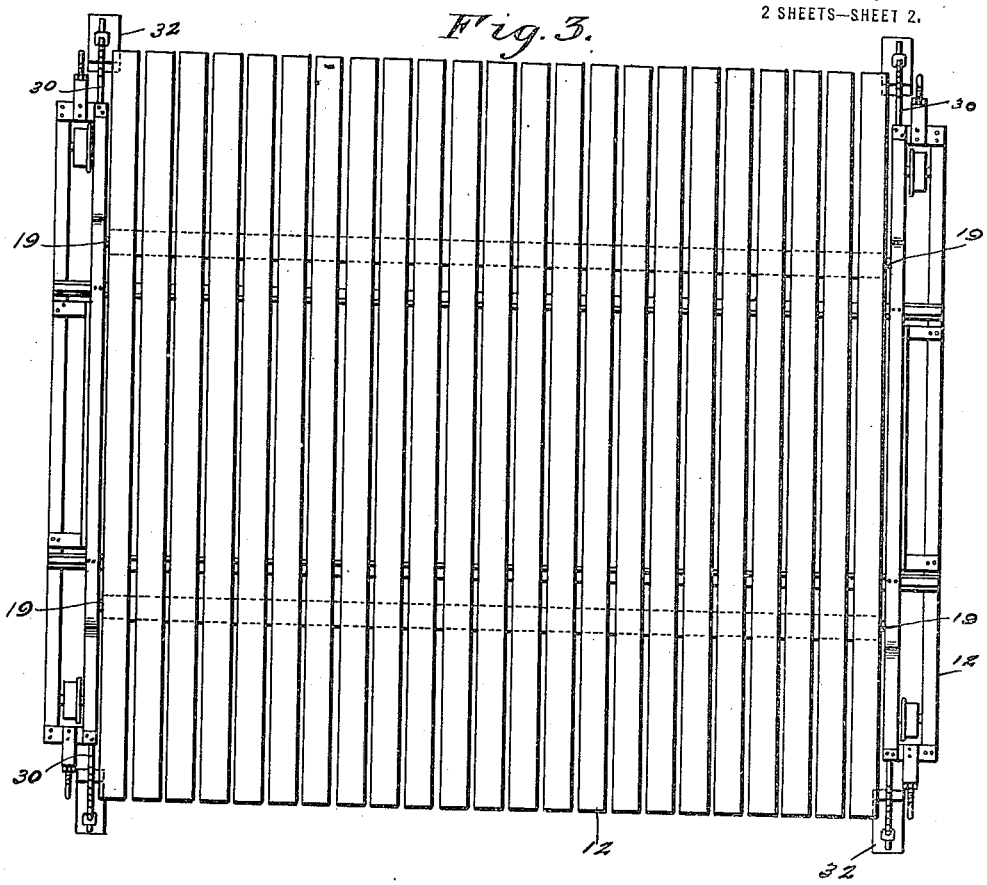
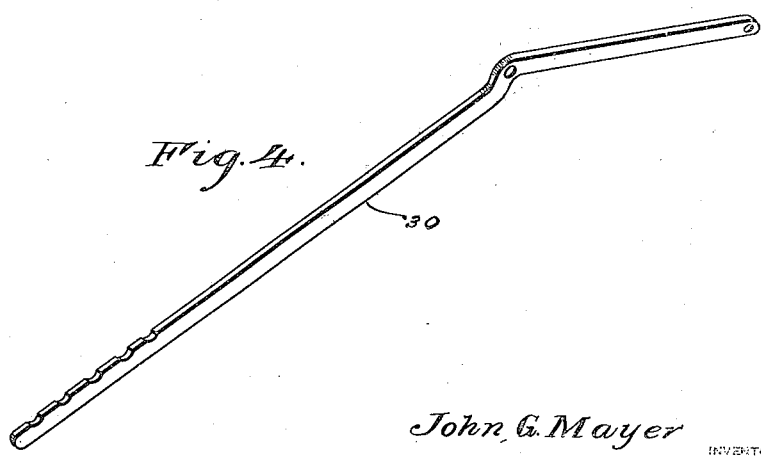

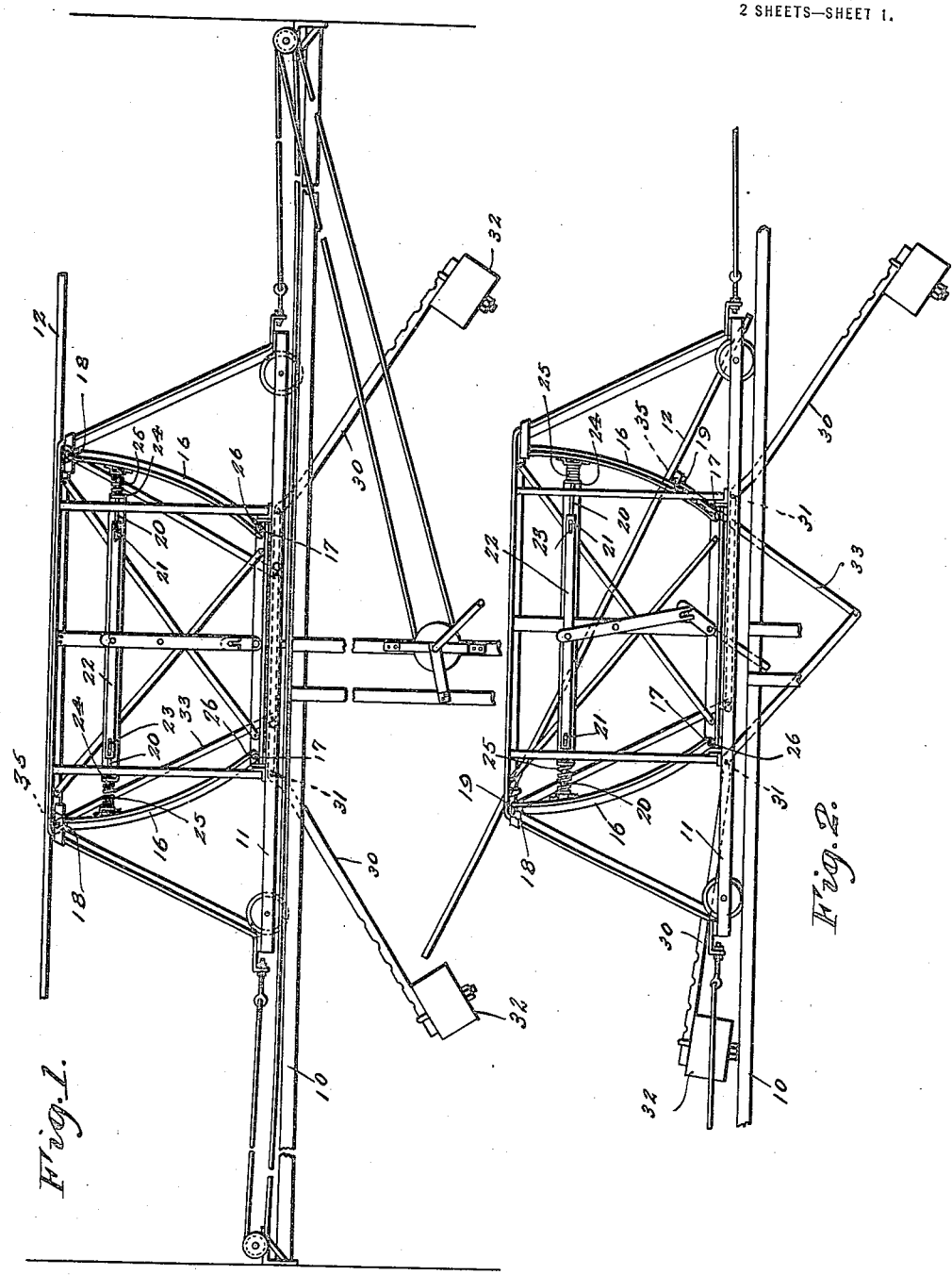

Patented Nov. 7, 1922.

1,435,123

UNITED STATES PATENT OFFICE.

JOHN G. MAYER, OF MILWAUKEE, WISCONSIN.

HAY CARRIER.

Application filed February 21, 1921. Serial No. 446,695.

*To all whom it may concern:*

Be it known that I, JOHN G. MAYER, a citizen of the United States, residing at Milwaukee, in the county of Milwaukee and State of Wisconsin, have invented new and useful Improvements in Hay Carriers, of which the following is a specification.

This invention relates to hay carriers such as illustrated in my Patent #1,342,341, and wherein use is made of a normally horizontal platform susceptible of tilting movement in either direction.

The chief characteristic of the present invention resides in the novel construction of means for normally holding the platform in a horizontal position, and automatically returning the platform to the position subsequent to being tilted.

More specifically stated, the platform is equipped adjacent each corner with a counter-balancing weight, these weights being associated with levers which are connected to the platform in a manner to normally hold the latter horizontally and to return it to a horizontal position after being tilted.

In the drawings forming part of this application like numerals of reference indicate similar parts in the several views, and wherein:

Figure 1 is a view in elevation showing the normal position of the platform.

Figure 2 is a similar view showing the tilted position of the platform.

Figure 3 is a plan view.

Figure 4 is a detail view of one of the levers and counter-balancing weights.

Referring to the drawings in detail, 10 indicates the rails of the track upon which the hay carriage is mounted for movement. The hay carriage comprises a wheeled frame 11 upon which is pivotally mounted a platform 12, the latter being susceptible of tilting movement toward either side of the frame 11. Any suitable means may be employed for moving the frame over the rails of the track, such as for instance the means disclosed in my above mentioned patent. While the platform may be mounted for pivotal movement in any desired manner, I preferably utilize the mechanism shown in my above mentioned patent, and which means embodies a pair of spaced arms 16 pivoted at their lower end as at 17, upon the wheel frame. Each of the arms 16 is provided with a notch 18 at a point adjacent the free end to receive a stud 19 projecting from the adjacent end of the platform. This construction obviously provides for the pivotal mounting of the platform which can be tilted from either side of the carriage as above stated. Each of the arms is connected with one end of a horizontally disposed bolt 20, and the corresponding or adjacent extremities of these bolts are offset as at 21 and connected together through the instrumentality of a bar 22 having slots 23 for the reception of the offset extremity 21 of said bolts. These bolts also slide through the openings in the guiding elements 24 mounted upon the wheel frame as shown. A coil spring 25 encircles each bolt having one end bearing against the adjacent guide and the opposite end bearing against the arm 16. The spring 25 functions to maintain the arm 16 in a position wherein studs 19 are received by the notches 18. Manifestly by this disposition of parts the platform is normally held in a horizontal position. A bar 26 is arranged at each side of the carriage and connects the arms 16 in pairs so that the corresponding arms at the opposite sides of the carriage are tripped in unison, any suitable means being employed for tripping the arms, preferably the means illustrated in my patent above mentioned.

For automatically returning the platform from a tilted to its normal horizontal position, use is made of a plurality of pivoted levers 30, there being one of these levers arranged adjacent each corner of the platform and pivoted as at 31. The counter-balancing weight 32 is carried by the outer end of each lever, while a link 33 is pivoted to the platform as at 35 and also operatively associated with the adjacent end of the lever 30, providing a connection between the lever and the platform. Consequently when the platform is tilted at one end of the wheeled frame, the pair of these levers are moved upon their pivot elevating the counter-balancing weight 32, and when the platform is relieved of its weight the same levers and counter-balancing weight function to automatically return the platform to its normal position.

While it is believed that from the foregoing description the nature and advantages of the invention will be readily apparent, I desire to have it understood that I do not limit myself to what is herein shown and described and that such changes may be resorted to when desired as fall within the scope of what is claimed.

What I claim is:

A hay carrier comprising a wheeled frame, a platform mounted thereon for pivotal movement, means for normally holding the platform horizontally, means for releasing said platform and permitting the same to assume an inclined position, a lever projecting from each corner of the platform and arranged obliquely with respect to the latter, each lever having a plurality of notches, a counter-balancing weight carried by each lever, and including a yoke adapted to be received by said notches, whereby said weight is adjustable longitudinally of the lever, and a plurality of links pivotally connected with the platform and operatively associated with said levers, whereby the platform is automatically returned to normal position subsequent to being tilted.

In testimony whereof I affix my signature.

JOHN G. MAYER.